(12) United States Patent
Varanda (10) Patent No.: US 8,115,731 B2
(45) Date of Patent: Feb. 14, 2012

(54) METHOD OF OPERATING A HANDHELD DEVICE FOR DIRECTIONAL INPUT

(75) Inventor: Marcelo Varanda, Ottawa (CA)

(73) Assignee: Research In Motion Limited, Waterloo, CA (US)

( * ) Notice: Subject to any disclaimer, the term of this patent is extended or adjusted under 35 U.S.C. 154(b) by 872 days.

(21) Appl. No.: 11/240,501

(22) Filed: Oct. 3, 2005

(65) Prior Publication Data

US 2006/0071905 A1 Apr. 6, 2006

Related U.S. Application Data

(62) Division of application No. 10/191,232, filed on Jul. 9, 2002, now abandoned.

(60) Provisional application No. 60/303,865, filed on Jul. 9, 2001.

(51) Int. Cl.
*G09G 5/00* (2006.01)

(52) U.S. Cl. .............................. 345/156; 345/157

(58) Field of Classification Search .......... 345/156–172; 200/61.52; 434/38; 250/231.12, 236; 356/154
See application file for complete search history.

(56) References Cited

U.S. PATENT DOCUMENTS

| | | | |
|---|---|---|---|
| 3,876,850 A * | 4/1975 | Amberny | 200/220 |
| 4,425,488 A * | 1/1984 | Moskin et al. | 200/220 |
| D278,341 S | 4/1985 | Scheid | |
| D293,241 S | 12/1987 | Wan et al. | |
| D313,413 S | 1/1991 | Langton | |
| 5,184,830 A | 2/1993 | Okada et al. | |
| 5,217,295 A | 6/1993 | Tortola et al. | |
| 5,224,151 A | 6/1993 | Bowen et al. | |
| 5,367,298 A | 11/1994 | Axthelm | |
| D357,253 S | 4/1995 | Wong | |
| 5,410,141 A | 4/1995 | Koenck et al. | |
| 5,426,449 A | 6/1995 | Danziger | |
| 5,436,954 A | 7/1995 | Nishiyama et al. | |
| 5,457,454 A | 10/1995 | Sugano | |
| 5,500,643 A | 3/1996 | Grant | |
| 5,602,566 A * | 2/1997 | Motosyuku et al. | 345/156 |
| 5,606,712 A | 2/1997 | Hidaka | |
| 5,611,031 A | 3/1997 | Hertzfeld et al. | |
| D383,756 S | 9/1997 | Henderson et al. | |
| 5,672,108 A | 9/1997 | Lam et al. | |
| D386,497 S | 11/1997 | Huslig et al. | |
| 5,712,911 A | 1/1998 | Her | |
| 5,737,394 A | 4/1998 | Anderson et al. | |
| D397,369 S | 8/1998 | Rissman | |
| D397,728 S | 9/1998 | Yuen et al. | |

(Continued)

FOREIGN PATENT DOCUMENTS

EP 0760291 3/1997

(Continued)

*Primary Examiner* — Kevin M Nguyen
*Assistant Examiner* — Kenneth B Lee, Jr.
(74) *Attorney, Agent, or Firm* — Moffat & Co.

(57) ABSTRACT

A directional input device for use in a handheld device is disclosed herein. The directional input device provides input to an element of the user interface in response to the inclination of the handheld. The input device can be embedded into any handheld communicating or computing device to provide directional input to an element of the user interface of the handheld without consuming space on the face of the device that could otherwise be used for a larger screen.

15 Claims, 4 Drawing Sheets

U.S. PATENT DOCUMENTS

| | | | |
|---|---|---|---|
| D399,537 S | 10/1998 | Chi et al. | |
| 5,818,437 A | 10/1998 | Grover et al. | |
| 5,825,353 A | 10/1998 | Will | |
| D403,362 S | 12/1998 | Fai | |
| 5,893,798 A | 4/1999 | Stambolic et al. | |
| 5,915,228 A | 6/1999 | Kunihiro et al. | |
| 5,920,308 A | 7/1999 | Kim | |
| 5,931,873 A | 8/1999 | Cisar | |
| 5,963,197 A | 10/1999 | Bacon et al. | |
| 5,974,238 A | 10/1999 | Chase, Jr. | |
| 5,982,520 A | 11/1999 | Weiser et al. | |
| 5,995,026 A | 11/1999 | Sellers | |
| 6,006,351 A | 12/1999 | Peretz et al. | |
| 6,014,429 A | 1/2000 | LaPorta et al. | |
| 6,023,779 A | 2/2000 | Fullam et al. | |
| 6,047,047 A | 4/2000 | Aldridge et al. | |
| 6,052,070 A | 4/2000 | Kivela et al. | |
| 6,094,197 A | 7/2000 | Buxton et al. | |
| 6,102,594 A | 8/2000 | Strom | |
| 6,103,979 A | 8/2000 | Motoyama et al. | |
| 6,107,997 A | 8/2000 | Ure | |
| 6,148,261 A | 11/2000 | Obradovich et al. | |
| 6,157,323 A | 12/2000 | Tso et al. | |
| 6,201,554 B1 * | 3/2001 | Lands | 345/169 |
| 6,212,412 B1 | 4/2001 | Rogers et al. | |
| 6,243,789 B1 | 6/2001 | Hasbun et al. | |
| 6,297,795 B1 | 10/2001 | Kato et al. | |
| 6,411,828 B1 | 6/2002 | Lands et al. | |
| 6,453,041 B1 | 9/2002 | Eryilmaz | |
| 6,573,883 B1 * | 6/2003 | Bartlett | 345/156 |
| 6,587,553 B1 | 7/2003 | Shaffer et al. | |
| 6,590,573 B1 * | 7/2003 | Geshwind | 345/419 |
| 7,289,102 B2 * | 10/2007 | Hinckley et al. | 345/156 |
| 2002/0093483 A1 * | 7/2002 | Kaplan | 345/158 |
| 2003/0038778 A1 | 2/2003 | Noguera | |

FOREIGN PATENT DOCUMENTS

| | | |
|---|---|---|
| WO | 9937025 | 7/1999 |
| WO | 0030381 | 5/2000 |

\* cited by examiner

METHOD OF OPERATING A HANDHELD DEVICE FOR DIRECTIONAL INPUT

CROSS REFERENCE TO RELATED APPLICATIONS

This application is a divisional application from U.S. application Ser. No. 10/191,232 filed Jul. 9, 2002, now abandoned and further claims priority from U.S. Provisional Application Ser. No. 60/303,865, filed on Jul. 9, 2001. These applications, including the specifications and drawing figures, are hereby incorporated into this application by reference.

FIELD OF THE INVENTION

The present invention relates to the field of controlling a handheld device. More particularly, the present invention relates to a method of operating a handheld device for directional input, converting a pattern of physical parameters into signals processed by the handheld device.

BACKGROUND OF THE INVENTION

Handheld computing and communication devices are well known. Cellular telephones, personal digital assistants (PDAs), and small form factor computers all require input from a user in order to operate. Typically, these handheld device have a processor connected to a memory, a screen and a user input device. The screen typically provides either a text or graphical interface through which options or applications are selected. In many instances a selection is made by use of a directional input device, such as a touchpad, rollerball, directional keypad, or thumbwheel. These options allow the user to position a pointer or a cursor on the list application or option desired. These directional input devices allow a user to select options, launch applications, and move pointers or cursors. Typically the directional input device works in conjunction with some variety of action button, such as a mouse button, or an integrated selector as used in many thumbwheel devices.

Directional input devices produce signals which are further processed by the handheld device to represent a direction to an element of the handheld device user interface. For example, in operations involving the displacement of a cursor on a screen, a handheld device user presses, rolls, touches, or exerts pressure on some directional sensor. The pattern of the physical parameter is converted into signals processed by the handheld, and ultimately the cursor or a pointer moves.

Directional input devices can be classified as having either one, or a plurality of degrees of freedom. Devices that have one degree of freedom are restricted to providing directional input in one dimension, for instance up-down, or left-right, but not both. In input devices with a plurality of degrees of freedom, several directions are possible, for instance both up-down and left-right. In typical directional input devices, only two dimensions are tracked. Though there are devices for tracking three dimensional input, typically these devices are used in conjunction with very specialised user interfaces. The quality of directional signals depends on the attributes of the sensed pattern of physical parameters, which ultimately depend on the type of sensors. For instance, simple pushbuttons or keys can only detect directional presence-either the key is pressed, or it is not. On the other hand, a roller or touch surface can detect directional degree.

The layout of the handheld device is determined by a number of ergonomic and aesthetic constraints. One of the greatest constraints is the overall size of the device, which for reasons of portability is tightly constrained. As a result of their small form factors, handheld devices typically trade off a desirable large screen, for necessary input device space. Without enlarging the handheld device, a larger screen must come at the cost of a smaller input device. There exist a number of well-known, convenient directional input devices, such as computer mice, trackballs and touchpads, that address a number of concerns in directional input devices. However, these devices either require a great deal of space or cannot be easily integrated with a portable handheld device.

To accomplish the reduction in input device size, many people have attempted to eliminate a distinct directional input device. Some devices have eliminated the distinct directional input device by employing a touch sensitive screen. This allows the user to select an option or application directly on the screen. This however, typically requires at least a rudimentary directional input device to allow scrolling through pages. Additionally, it requires two-handed operation, which is not always possible, and should not be necessary to perform simple tasks with the handheld device.

Another strategy is to employ a thumbwheel, such as a jog-dial, which can be place on the side of the handheld. This removes the directional input device from the face of the device and can save considerable space. By combining the simplicity of a roller, with optimal placement for use with the thumb, a thumbwheel is provided on handheld devices for directional input. A thumb roll in a first direction is interpreted as a directional input corresponding to a positive displacement on a first primary direction, such as up, whereas a thumb roll in a second opposite displacement is interpreted as a directional input corresponding to a negative displacement along the same first direction. Furthermore, by detecting a presence condition, such as the user holding down an "alt" key, at the same time as a thumb roll, the thumb roll can be interpreted to provide a pointer or cursor displacement in a second direction. Thus a thumbwheel can be adapted to provide multidirectional input. An example of bi-directional input, a specific type of multidirectional input, is the displacement of a cursor in a text editor pane wherein one direction corresponds to the character position of the cursor and wherein the other direction corresponds to the line number of the cursor. Though thumbwheels address many concerns, the thumbwheel requires a rotatable key to be installed in the handheld, which is only on one side of the device. The positioning of the directional input device on the side of the device makes the device difficult to use for either right or left handed people. Additionally, because the handheld is of a standard size, the positioning of the thumbwheel can make the device difficult to use for people with large or small hands. Furthermore, the thumbwheel, as with any mechanical device, is subject to mechanical wear and failure, and additionally increases the cost of manufacturing the mould for the device's exterior due to the additional apertures required.

In classifying directional input devices it should be noted that directional input devices can have both presence and degree. The simplest directional input device has presence, such as for example in an arrangement of pressure sensors such as buttons, each of which is associated with a fixed increment in a particular direction, such as is the case for example with arrow keys. Either a key is pressed, or it is not. The user's input has presence in one particular direction and is sensed in this fashion and the handheld device is signalled accordingly.

More advanced directional input devices can provide directional degree. Directional degree is related to the magnitude of displacement along a physical degree of freedom of the sensor. For instance, in a roller sensor, the degree of roller activity is proportional to the displacement of the roller and has the same sign as the direction of displacement. The degree of user activity in a direction is sensed in this fashion and the handheld device is signalled accordingly. Degree can be simulated in devices that can only provide presence through mechanisms such as key repeat rate, which provides a plurality of presence signals if the input device is activated for a sufficient amount of time. Some directional input devices have both presence and degree, such as a rollers or touch surfaces, that are combined with at least one button.

Directional input devices can also be categorized by the degrees of freedom that they provide. Directional input devices which have only one physical degree of freedom, such as thumbwheels, are typically used to provide directional input restricted to a single path. Directional input devices which have more than one degree of freedom are traditionally used in multidirectional input, such as for example a capacitive touch surface type sensor manipulated with the finger or a stylus. Directional input devices with several degrees of physical freedom tend to be more expensive and complex to operate than sensors with only one degree of freedom.

As described above, sensors with only one physical degree of freedom, a presence based control can be used to select alternate directions, which are typically perpendicular to the primary direction, thereby providing simulated multidirectional input. An example is the aforementioned a thumbwheel which moves a cursor in one dimension in a native state, but moves the cursor in a perpendicular direction when an "alt" key is depressed.

In the case of sensors with several degrees of freedom, presence can be used to constrain the directional input signals to a major direction, such as horizontal, vertical, or diagonal, thereby providing a simulated unidirectional input, which facilitates the drawing of a straight line on a freeform surface such as a touchpad. To achieve this, a user could use a touch surface to draw a diagonal line, and then hold an action key to constrain the line to the direction of the largest component, either horizontal or vertical.

Current techniques of directional input control of handhelds often combine varied sensor types and methods to provide varied forms of directional input, each of which presents some advantages but unfortunately also has drawbacks.

Added user operational complexity may be required for simulated uni-dimensional input on devices using traditional multidegree of freedom directional input devices. The same can be said for simulated multidimensional input using traditional single degree of freedom directional input devices. The mere combination of the two types of input devices, such as providing both a thumbwheel and a touch surface, overcomes many problems, but still requires the expensive tooling required to install a thumbwheel, and does not eliminate the valuable area required by the touchpad.

There is therefore a need for a directional input device with a minimized size, to allow for a larger screen, while reducing the tooling costs associated with apertures on the moulding of the handheld device. There is a further need for a directional device that is capable providing directional input to a handheld without requiring dual handed operation, and without providing a preference to right handed people, left handed people, or people with a particular size of hand.

SUMMARY OF THE INVENTION

It is an object of the present invention to obviate or mitigate at least one disadvantage of previous directional input devices in handheld computing or communicating devices.

In a first aspect, the present invention provides an input device, for embedding in a handheld device, for providing directional input to an element of the user interface in the handheld device in response to an inclination of the handheld device. The input device comprises a primary contact positionally fixed in the handheld, and a directional contact positionally fixed in the handheld and operatively connected to the primary contact. A circuit closing means, such as a ball bearing or a mercury contact, is movable on, and in electrical contact with, the primary contact. In response to inclination of the handheld device in the direction of the directional contact, the circuit closing means moves between a neutral position in which the primary contact and the directional contact form an open circuit, and an active position in which the primary contact and the directional contact form a closed circuit. A direction interpreter, operatively connected to the primary and directional contacts, generates the directional input to the element of the user interface when the closed circuit is formed. In a further embodiment, a second directional contact is positionally fixed in the handheld and operatively connected to the primary contact to form a second open circuit when the circuit closing means is in the neutral position. The second open circuit is closable by the circuit closing means, in response to inclination of the handheld device in the direction of the second directional contact by movement of the circuit closing means to a second active position. In this case, the direction interpreter generates a second directional input when the circuit closing means is in the second active position.

In another embodiment, the input device includes a plurality of subsequent directional contacts, positionally fixed in the handheld. Each subsequent directional contact is connected to the primary contact to create a plurality of subsequent open circuits. Each subsequent open circuit closable by the circuit closing means in response to an inclination of the handheld device in the direction of the associated subsequent directional contact by movement of the circuit closing means to a subsequent active position. This embodiment can be modified such that each of the directional contacts is further connected to adjacent directional contacts to create a plurality of secondary open circuits. Each of the plurality of secondary open circuits is closable by the circuit closing means in response to inclination of the handheld to a junction of adjacent directional contacts.

The input device of claim 1, further including a base, electrically connected to the primary contact, for supporting the circuit closing means in response to movement between the neutral position and the active position.

In a further aspect, the present invention provides an input device, embedded in a handheld device, for providing directional input to an element of the user interface in the handheld device in response to an inclination of the handheld device. The input device comprises a base positionally fixed in the handheld. A plurality of directional contacts, positionally are fixed in the handheld around the base. Each directional contact is operatively connected to at least one adjacent directional contact. Circuit closing means, movable on the base between a neutral position and a plurality of active positions, is provided. In the neutral position the base and the plurality of directional contacts are in open circuit. In the active positions two of the plurality of directional contacts are operatively connected to close the open circuit in response to the inclination of the handheld device in the direction of a pair of adjacent directional contacts. A direction interpreter is operatively connected to the plurality of directional contacts, and generates the directional input in response to closing the open circuit. Preferably, the base biases the circuit closing means to the neutral position, and is provided with a plurality of grooves for guiding the circuit closing means between the neutral position and at least one of the plurality of active positions.

In another aspect, there is provided a method of controlling an element of a user interface of a handheld device based on the inclination of the handheld device. The method comprises sensing the inclination of the handheld device; generating a directional input signal representative of the inclination of the handheld device; transmitting the generated directional input signal to the user interface of the handheld device; and processing the transmitted directional input signal to control the element of the user interface.

Other aspects and features of the present invention will become apparent to those ordinarily skilled in the art upon review of the following description of specific embodiments of the invention in conjunction with the accompanying Figs.

BRIEF DESCRIPTION OF THE DRAWINGS

Embodiments of the present invention will now be described, by way of example only, with reference to the attached Figs., wherein.

DETAILED DESCRIPTION

Generally, the present invention provides a directional input device integrated into a handheld device. In particular the present invention provides a directional input device that is internal to the handheld device, so that directional input is provided by manipulation of the orientation of the entire handheld device.

The present invention provides a directional input device that provides a directional input signal when the orientation of the handheld device is manipulated. For example, if it desired to move the cursor to the right, the handheld would be tilted to the right. This completely removes the directional input device from the face of the device to allow for a larger screen, and does not require either an external mechanical mechanism subject to external wear and tear or an expensive moulding modification.

Figure 1:
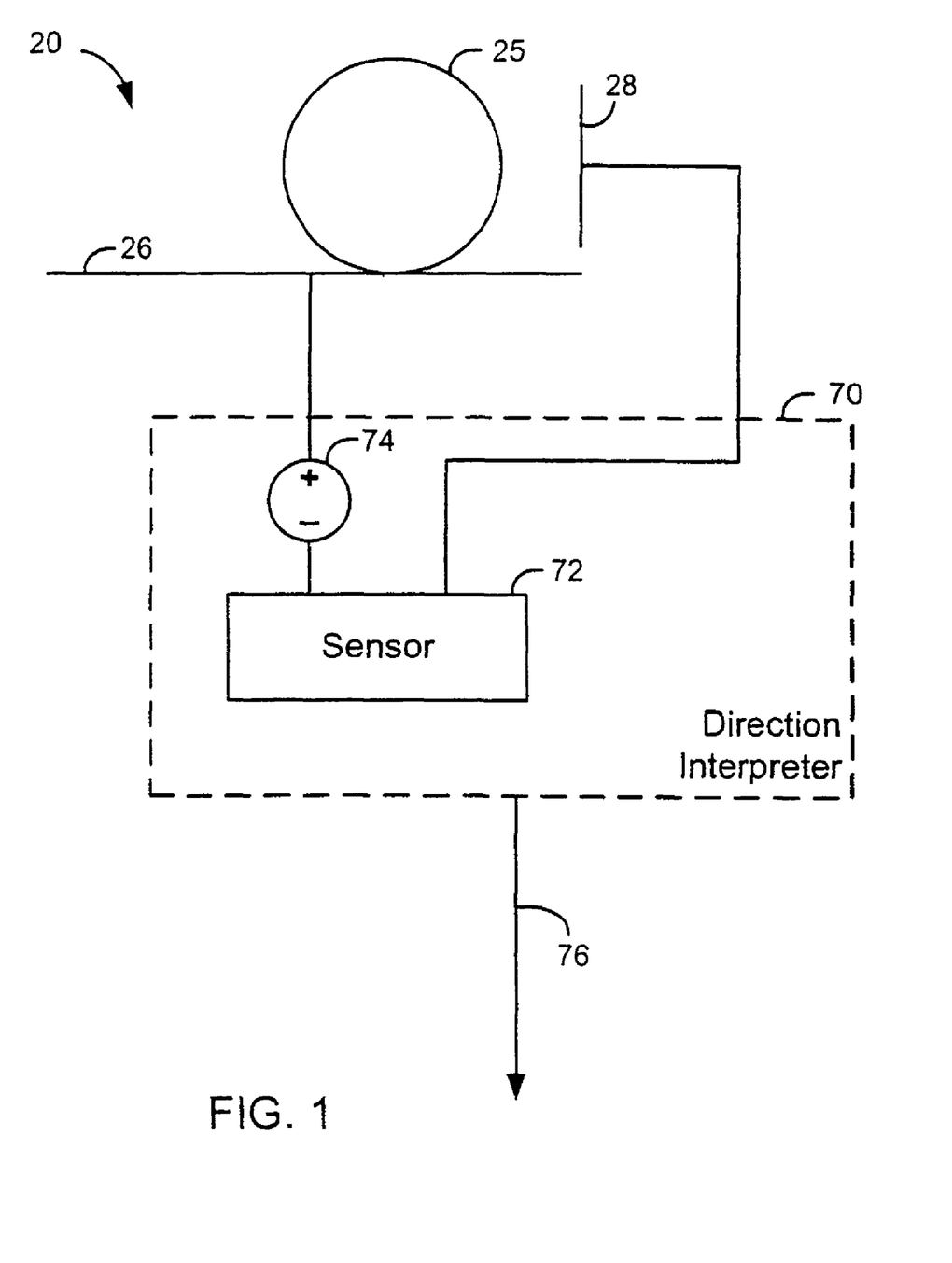
FIG. 1 illustrates an embodiment of a system of the present invention.

FIG. 1 illustrates the principle of the present invention. Directional input device 20 is typically embedded in a handheld device. A base, or primary contact 26, is connected to a directional contact 28, to create an open circuit. Between primary contact 26 and directional contact 28 is a direction interpreter 70. When a connection is made between primary contact 26 and directional contact 28, direction interpreter 70 senses the closing of the open circuit and generates a directional input signal 76. Circuit closing means 25 is provided, so that the open circuit can be closed by inclining the handheld. When the handheld device is inclined, directional input device 20 is inclined, which results in base 26 tilting, allowing gravity to pull circuit closing means 25 towards directional contact 28 which causes circuit closing means 25 to close the open circuit. As illustrated in FIG. 1, circuit closing means 25 is in a neutral position, which corresponds to the open circuit remaining open. When the handheld device is sufficiently inclined, circuit closing means 25 moves to an active position, in which the open circuit is closed. One of skill in the art will appreciate that a number of different implementations of circuit closing means are available. Illustrated in FIG. 1 is a simple embodiment, where a ball bearing is used as the circuit closing means. Tilting the directional input device will cause the ball bearing to roll along primary contact 26 towards directional contact 28. Upon touching contact 28, the bearing will close the circuit. In an alternate embodiment, circuit closing means 25 is a small quantity of mercury that forms a mercury contact. The use of mercury as circuit closing means 25, reduces the present invention to a mercury switch that is used to provide a directional input.

One of skill in the art will appreciate that a number of embodiments of direction interpreter 70 are possible. FIG. 1 illustrates a simple embodiment, wherein contacts 26 and 28 are connected by a power supply 74 and a sensor 72. While contacts 26 and 28 are connected in an open circuit configuration no power flows between them, but when circuit closing means 25 moves to the active position the open circuit is closed and sensor 72 can detect the current flow between the contacts. One of skill in the art will appreciate that this is a simple embodiment of the direction interpreter 70, and that further embodiments could be employed by one of skill in the art without departing from the scope of the present invention.

Figure 2:
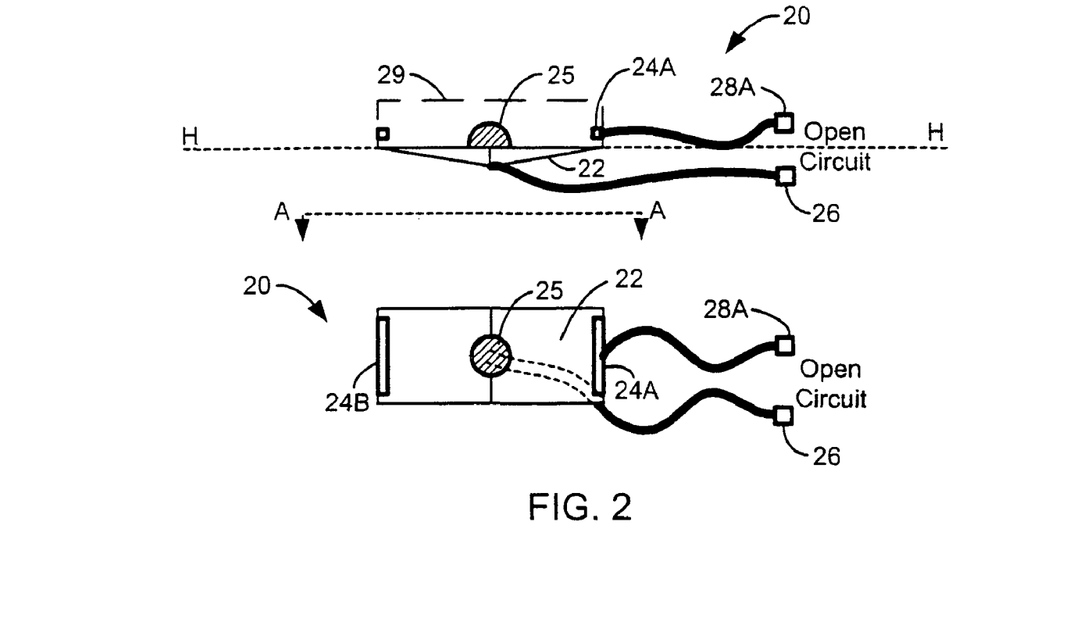
FIG. 2 illustrates top and side views of an embodiment of a 1 degree of freedom directional input device of the present invention in a neutral position.
Figure 3:
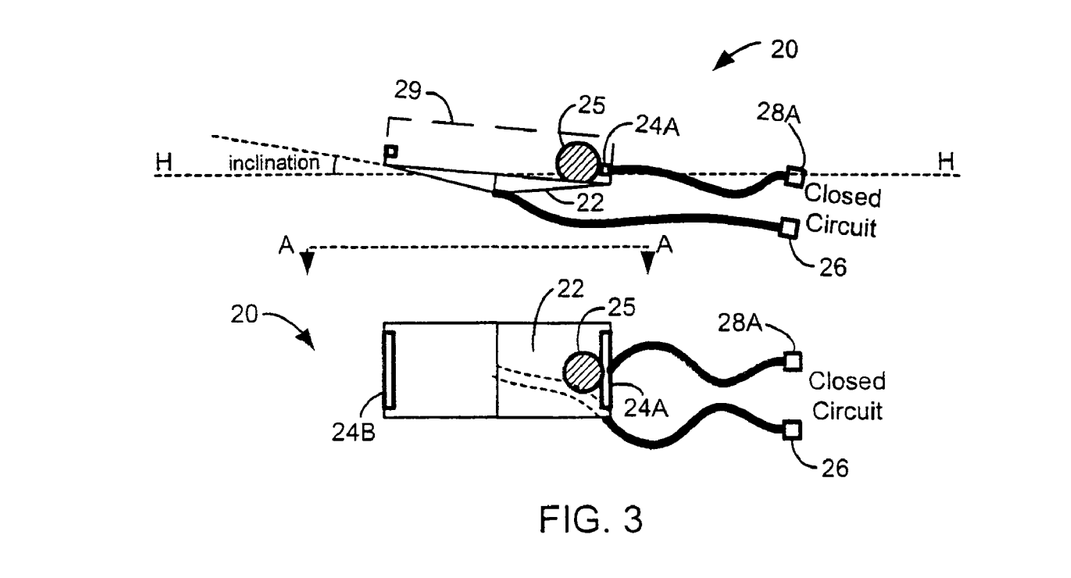
FIG. 3 illustrates top and side views of an embodiment of a 1 degree of freedom directional input device of the present invention in an active position.

FIG. 2 illustrates the top and side views of an improved one degree of freedom directional input device according to the present invention. Though inclining the device of FIG. 1 results in the open circuit being closed, there is no guarantee that circuit closing means 25 will return to its neutral position when device 20 returns to a horizontal inclination. This is problematic for both applications of the present invention in which degree is simulated, and applications where both positive and negative directional control (e.g. both left and right inputs) is required. To overcome this, base 22 of device 20, as illustrated in FIGS. 2 and 3, is designed to bias circuit closing means 25 to the neutral position when the inclination is ceased. In the embodiment illustrated in FIGS. 2 and 3, the base is curved so that gravity will pull the circuit closing means back to the neutral position, this gravitationally biases circuit closing means 25 to the neutral position. Base 22 is connected to lead 26, which forms an open circuit with lead 28A, which is connected to contact 24A. One of skill in the art will readily appreciate that the open circuit between leads 26 and 28A include direction interpreter such as direction interpreter 70 of FIG. 1. The direction interpreter has been omitted for clarity of the drawings. Also omitted for clarity is a lead from connection 24B that forms a second open circuit with lead 26. As device 20 of FIGS. 2 and 3 is inclined in one direction or another, the circuit closing means 25 is pulled by gravity towards one of the contacts (contact 24A as illustrated in FIG. 3). The direction interpreter detects the closed circuit when circuit closing means 25 is in an active position and generates a directional input signal. Lid 29 serves to both contain the circuit closing means 25, and to seal device 20. The embodiment of FIGS. 2 and 3 provides a directional input device with a biased neutral position and two active positions, each active position being associated with the closure of one of the two open circuits.

One of skill in the art will readily appreciate that a two degree of freedom directional input device can be implemented using a simple extension of the above embodiment. Whereas the embodiment of FIGS. 2 and 3 restricts the path of circuit closing means 25 to a single dimension, in a 2-degree of freedom embodiment, circuit closing means 25 is allowed to move freely in two directions, and is bounded by a plurality of contacts arranged about the base so as to form an approximation of a circle. Each directional contact is connected to the base in the same fashion that contacts 24A and 24B were connected to base 22, via lead 26, to create an open circuit. When the handheld is tilted in any direction the directional input device 20 is inclined. This causes the circuit closing means 25 to create a closed circuit between one of the contacts and the base by gravitationally overcoming the bias to the neutral position. This can be sensed by a direction interpreter which would provide a directional input signal. One of skill in the art will readily appreciate that the circuit closing means will often close more than one circuit simultaneously by touching two adjacent directional contacts. The direction interpreter will recognise the multiple closed circuits as motion in a direction corresponding to a combination of the directions associated with each directional contact in the closed circuits.

Figure 4:
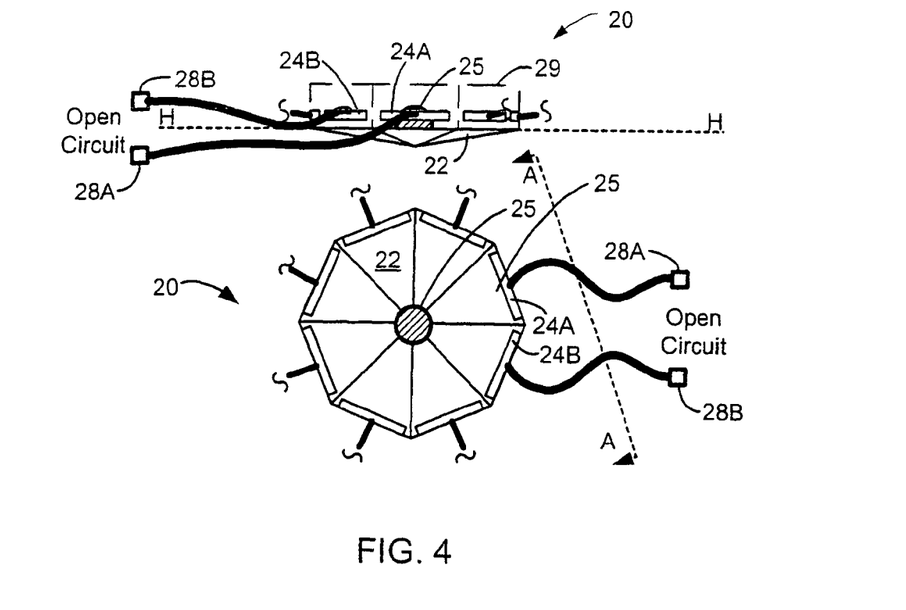
FIG. 4 illustrates top and side views of an embodiment of a 2 degree of freedom directional input device of the present invention in a neutral position.
Figure 5:
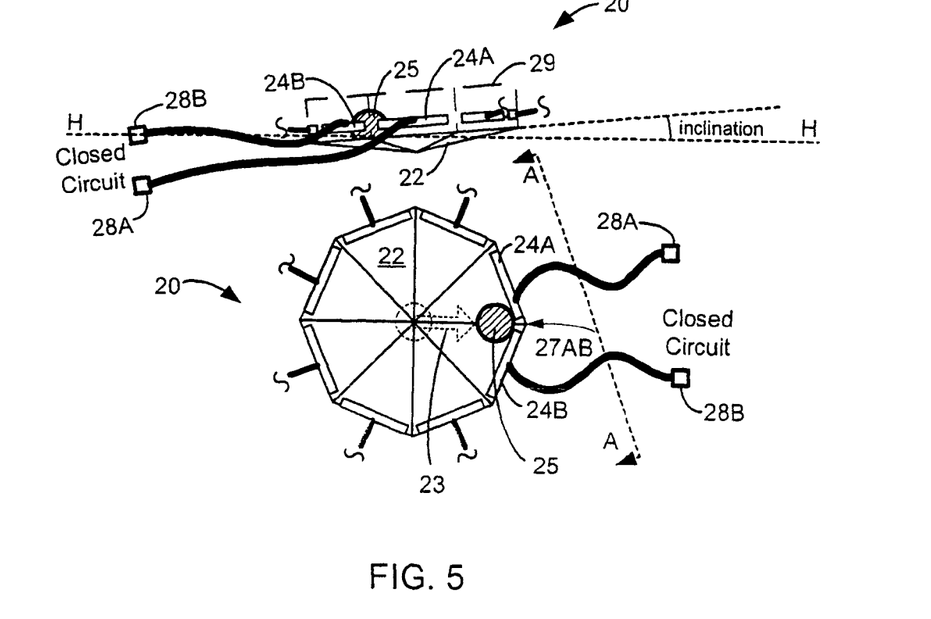
FIG. 5 illustrates top and side views of an embodiment of a 2 degree of freedom directional input device of the present invention in an active position.

FIGS. 4 and 5 illustrate another embodiment of the present invention. Referring to FIG. 4 a first embodiment of a two degree of freedom directional input device 20 is illustrated. The orientation sensor 20 is preferably embedded in a handheld device. FIG. 4 illustrates the present embodiment in the neutral position. A dish, or base, 22 supports circuit closing means 25 and biases circuit closing means 25 to the neutral position. As illustrated, base 22 is substantially horizontal with respect to line HH. A plurality of direction contacts 24A, 24B, and further unlabelled direction contacts, are disposed on the interior of a non-conductive cover 29 in a peripheral fashion, to form a circular approximation. Preferably, at an equilibrium orientation of the handheld device, the shape of base 22 biases the circuit closing means 25 to the neutral position.

Referring to FIG. 5, an inclined or active position is illustrated. Base 22 is inclined past a certain threshold by inclining the handheld in the direction 23 of a pair of direction contacts 24A,B. Circuit closing means moves along a guide 27AB and comes to rest on the direction contacts 24A,B thereby creating a closed circuit condition which can be sensed between the direction contact leads 28A,B. This embodiment does not require a contact for the base 22.

In reference to FIGS. 1-5, various embodiments of orientation sensors are described. Although not expressly shown in the Figs., many alternative sensors are compatible with the method, such as a solid state compass or gyroscope which senses orientation with respect to magnetic north, or a pendulum such as a tine pendulum, a micro saucer, or a solid state memory device. The choice of an actual orientation sensor is a matter which depends on the application of the present invention to a particular handheld device and the choice of sensor is obvious to those knowledgeable in the field in light of a particular handheld and the present invention.

Although not expressly shown in the drawings, the use of a sensor that detects orientation in terms of degree instead of presence is also envisaged. Many orientation sensors can be used to detect degree using orientation, of varied complexity from as simple a principle as a pendulum, or a solid state compass, to as complex a principle as a gyroscope. The substitution of any orientation sensor is considered obvious to a person skilled in the art in view of this invention.

Finally, having described general principles of directional input, having considered examples of handheld devices, and having considered examples of orientation sensors in reference to FIGS. 1-5, embodiments of the method for operating a handheld device for directional input will be described next by way of example and reference to FIG. 6.

Figure 6:
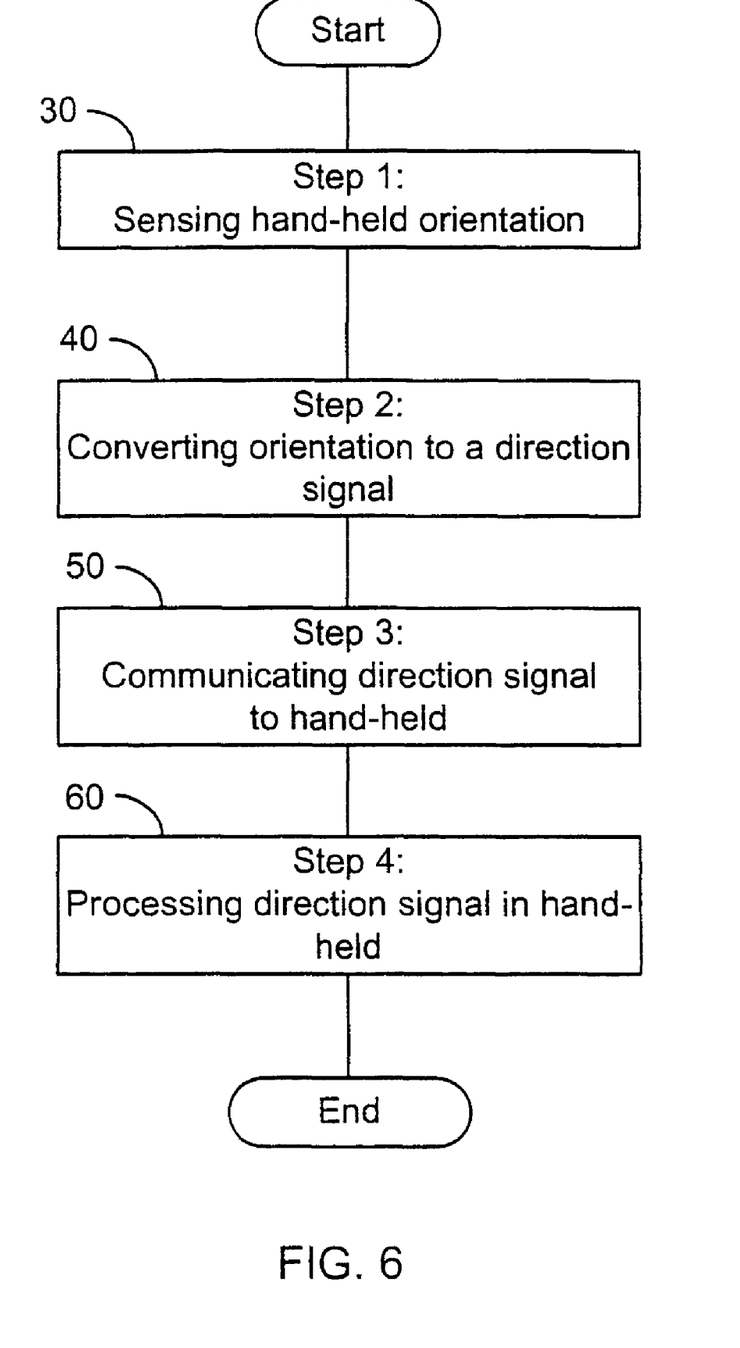
FIG. 6 is a flowchart which illustrates the steps in one embodiment of the method of directional input for a handheld device in accordance with the present invention.

The method of FIG. 6 can be used to signal to an element of the user interface in the handheld that a change in orientation has occurred. Typically the element of the user interface is either a cursor or a pointer. In relation of the embodiments of the system as illustrated in FIGS. 1-5, this signalling to the handheld occurs when the circuit closing means moves to an active position. The first step 30 of the method is to sense the handheld orientation or inclination. Once the handheld orientation has been sensed, the second step 40 is to convert the orientation to a direction signal. Then, at the third step 50 the direction signal is communicated to the handheld. Finally, at the fourth step 60 the direction signal is further processed in the handheld. In the fourth step, events are generated by the further processing of the signal, such as by detecting patterns of the signal which correspond to patterns of the physical parameters of the sensors can be as complex or as simple as required. For instance as accelerated directional input, to as simple as a simple click caused by the flick of the wrist, as defined by processing steps.

Although not expressly shown in the drawings, the second step 40 is not required if the sensed orientation is already converted to a direction signal by a direction interpreter. Adaptation of the present invention to use alternate orientation sensors is within the scope of the invention as it would be obvious to a person skilled in the art in view of this disclosure.

In one embodiment, orientation is used as the basis for directional input on a handheld device. Returning to FIG. 6, in the second step 40, the orientation is converted to a direction signal compatible with traditional directional input means, such as a roller, touch pad, or arrow keys, thereby allowing a next generation handheld using the method to reclaim the space used by traditional directional controls such as a thumbwheel.

In another embodiment, orientation is used in conjunction with other forms of directional input such as that provided by buttons, a roller, a touch surface or any other sensor capable of providing directional input, on a handheld device. For instance, a thumbwheel can be used to signal a degree of displacement in conjunction with the orientation sensed at the first step 30. At step 40, the sensed orientation and amount of roller displacement are converted into a direction signal.

In an axis constraining embodiment, a change in orientation constrains the axis corresponding to directional input on a handheld device. For instance, a touch pad on an handheld oriented so as to be inclined along an inclination axis is used to signal a degree of displacement in conjunction with the orientation sensed at the first step 30. At step 40, the sensed orientation and amount of touch pad displacement are converted into a direction signal constrained in a direction substantially perpendicular to the inclination axis.

In an axis selecting embodiment, the orientation is mapped to an axis corresponding to directional input on a handheld device. For instance, a touch pad on an handheld oriented so as to be inclined along an inclination axis is used to signal a degree of displacement in conjunction with the orientation sensed at the first step 30. At step 40, the sensed orientation and amount of touch pad displacement are converted into a direction signal constrained in a direction substantially parallel to the inclination axis. Alternatively, a sensed change of orientation sensed at step 30 can cause roller displacement to operate on an alternate direction at step 60.

The present invention provides a directional input device that does not consume surface area on the face of a handheld device. This allows for a larger screen in the same form factor as a handheld device with a face mounted directional input device. Additionally, because it can be completely embedded in the handheld, no external access is required, obviating the need for expensive apertures in the moulding. Furthermore, reliability of the directional input device is improved by eliminating the mechanical wear that occurs with an externally accessible directional input device such as a thumbwheel.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A handheld computing device, comprising:
   a display;
   an internally located directional input device providing a directional input signal, the directional input signal corresponding to an axis of inclination of the handheld computing device and indicating an orientation;
   a second directional input device providing a second directional input signal, the second directional input signal indicating an amount of displacement;
   a processor coupled to the internally located directional input device and the second directional input device and operable to receive and process the directional input signal in conjunction with the second directional input signal; and
   a memory subsystem, the memory storing an operating system executed by the processor to display on the display a graphical user interface for controlling the operation of the handheld computing device, wherein the graphical user interface provides a graphical element;
   wherein the operating system comprises processor-executable instructions that cause the graphical element to move by the amount of displacement in a direction substantially parallel or substantially perpendicular to the orientation.

2. The handheld computing device of claim 1, wherein the internally-located directional input device comprises:
   a primary contact positionally fixed in the handheld computing device;
   at least one directional contact positionally fixed in the handheld computing device and operatively connected to the primary contact;
   circuit closing means, movable on, and in electrical contact with, the primary contact, the circuit closing means moving in response to inclination of the handheld computing device in the direction of any one of the at least one directional contact, between a neutral position in which the primary contact and the any one of the at least one directional contact form an open circuit, and an active position in which the primary contact and the any one of the at least one directional contact form a closed circuit; and
   a direction interpreter, operatively connected to the primary contact and the at least one directional contact, for generating the directional input signal.

3. The handheld computing device of claim 2, wherein the directional input signal is uniquely associated with the direction of the inclination.

4. The handheld computing device of claim 2, wherein each of the at least one directional contact are further connected to adjacent directional contacts to create a plurality of secondary open circuits, each of the plurality of secondary open circuits closable by the circuit closing means in response to inclination of the handheld to a junction of adjacent directional contacts.

5. The handheld computing device of claim 4, wherein the direction interpreter generates the directional input when one of the secondary open circuits is closed.

6. The handheld computing device of claim 2, further including a base, electrically connected to the primary contact, for supporting the circuit closing means in response to movement between the neutral position and the active position.

7. The handheld computing device of claim 6, wherein the base biases the circuit closing means to the neutral position.

8. The handheld computing device of claim 2, wherein the circuit closing means is a ball bearing.

9. The handheld computing device of claim 2, wherein the circuit closing means is a mercury contact.

10. The handheld computing device of claim 1, wherein the graphical element is a pointer.

11. The handheld computing device of claim 1, wherein the processor is configured to detect movement patterns from the directional input signal and wherein the graphical element is further responsive to the detected movement patterns.

12. The handheld computing device of claim 11, wherein the graphical element is configured to accelerate in response to a detected movement pattern.

13. The handheld computing device of claim 11, wherein the graphical element is configured to perform a selection function in response to the detected movement pattern.

14. The handheld computing device of claim 13, wherein the detected movement pattern is a flick of the wrist.

15. The handheld computing device of claim 1, wherein the second directional input device is selected from the group consisting of a button; a roller; a touch surface; and a thumbwheel.

* * * * *